Feb. 12, 1952 — F. BELMONT — 2,585,214
ELASTIC CLOSURE FRUIT BAG
Filed July 15, 1949
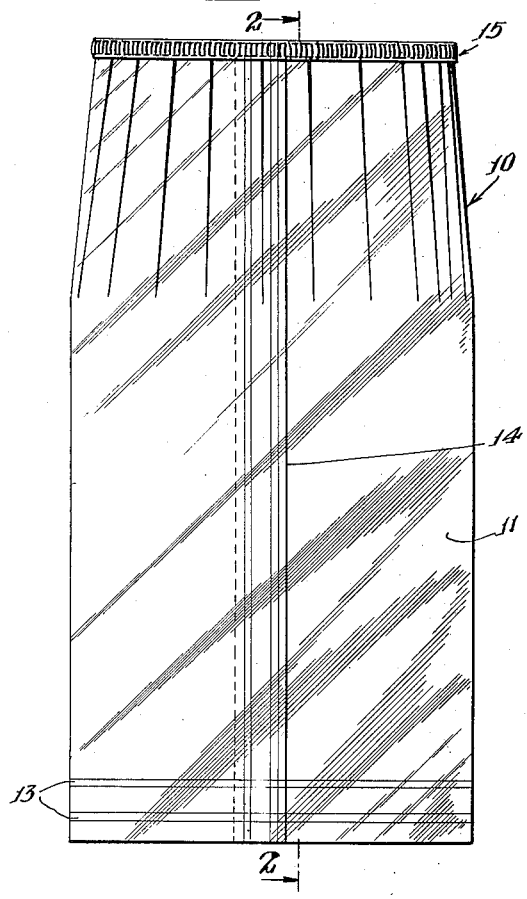
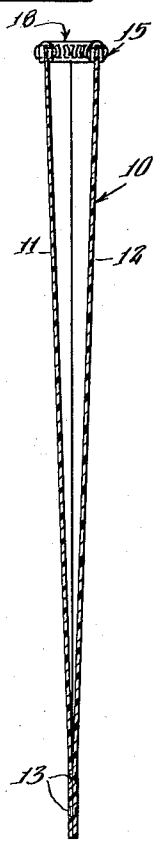
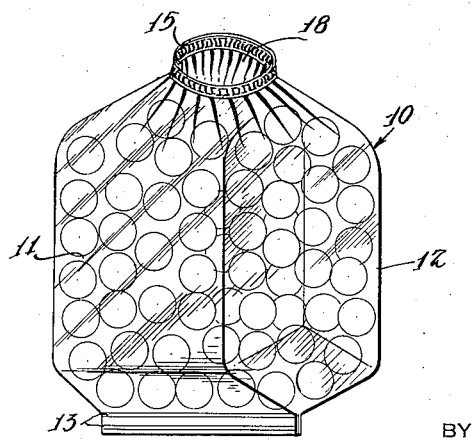
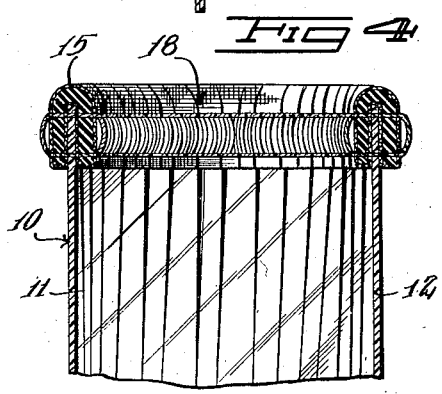
INVENTOR.
Frank Belmont
BY Lyon & Lyon
ATTORNEYS.

Patented Feb. 12, 1952

2,585,214

UNITED STATES PATENT OFFICE 2,585,214

ELASTIC CLOSURE FRUIT BAG

Frank Belmont, Anaheim, Calif.

Application July 15, 1949, Serial No. 104,970

4 Claims. (Cl. 229—62)

This invention relates to receptacles, and more particularly to a bag particularly adaptable for the packaging of fruit or vegetables such as oranges, apples, potatoes and the like. This application constitutes a continuation in part of my co-pending previous application, Serial No. 55,039, filed October 18, 1948, now abandoned.

In the packing of fresh fruit or vegetables and particularly fresh citrus fruit and apples and the like it is necessary to permit access of air to the packaged fruit or vegetable so that the fruit or vegetable may breathe and thus retain its life and freshness and flavor. However, it is desirable to limit the amount of fresh air which is allowed to come in contact with the fruit or vegetable in order to control drying out or shrinking of the fruit or vegetable.

The foregoing considerations have resulted heretofore in making it impractical to attempt to package fresh fruits or vegetables in air tight containers such as bags of cellophane, Pliofilm or the like if any shelf life is expected for the fruit or vegetables.

It is accordingly one object of this invention to provide a bag which can be manufactured of cellophane, Pliofilm or the like, which is transparent and permits observation of the fruit and vegetables and which nevertheless provides limited access of fresh air to the packaged fruit to permit breathing of the fruit and vegetables to prevent drying and shrinking thereof.

It is a feature of this invention that a bag of cellophane, Pliofilm or the like, is provided having a closure controlled by an elastic band which tends to close the bag only partially thus leaving an opening to the packaged contents.

It is a further feature of this invention that the size of the opening of the package, when filled with fruit or vegetables, is controlled within critical limits thus regulating the amount of air which is allowed to enter the package for breathing of the fruit and vegetables, regulating the escape of carbon dioxide gas and moisture from the fruit and vegetables. When these critical limits are maintained, it is found that the fruit remains fresh without undue drying or shrinking over prolonged periods of time far in excess of similar fruits or vegetables packaged in open mesh bags.

These and other objects, features and advantages of the invention will be apparent from the annexed specification in which:

Figure 1 is a side view of the bag embodying the present invention shown folded upright.

Figure 2 is a cross section taken along the line 2—2 of Figure 1.

Figure 3 is a reduced side view of a bag similar to the bag shown in Figure 1, shown filled with fruit or vegetables.

Figure 4 is an enlarged cross section of the throat of the bag.

Referring now more particularly to the drawings, there is shown a bag, indicated generally at 10 comprising a front side 11 and a rear side 12 which are joined at the bottom as at 13. The sides 11 and 12 are formed of one piece joined together by a suitable seam 14 and at the top of the sides 11 and 12 an elastic member 15 is provided. While in my previous co-pending application, I have shown the elastic member affixed to the top of the bag by forming a fold at the top of the bag within which the elastic member is received, it has been discovered that it is preferable to form the elastic member as herein shown, particularly in Figure 4. The elastic herein utilized is what is known as cotton covered elastic which in some forms is readily available on the open market. This is a ribbon elastic comprising cotton threads over elastic and such elastic ribbon is preferably attached to the bag by folding the edges of the ribbon downward over both sides of the top of the bag and stitching through both folds of the ribbon and the top of the bag by means of what is known in the sewing art as a floating stitch.

The elastic employed must have a rather critical amount of elasticity. Thus in bags designed for the packaging of five pounds of fresh oranges, which when fully opened, give an opening of approximately eight (8) square inches, the elastic must be such as to close the opening to approximately two (2) square inches when the bag is fully closed. This, therefore, requires an elastic capable of a 400% stretch.

The bag, itself, is preferably formed of Pliofilm, cellulose acetate, cellophane or other thin transparent film.

With the bag formed as hereinabove described, when the bag is filled with fresh fruit or vegetables and placed in an upright position, a chimney effect has been noticed which serves to dissipate the $CO_2$ gas and moisture liberated by the fruit and permit the fruit to breathe. Tests have been made which show that if the bag does not have the partial opening, indicated at 18 in Figure 3, when fully packed $CO_2$ gas accumulates very rapidly and thus asphyxiates the fruit or vegetables. However, with the bag manufactured as hereinabove described, due to the chimney effect noted, this $CO_2$ gas is dissipated at the desirable rate. However, the rate of dissipation of gas and moisture is controlled by the size of the opening and thus undue shrinkage of the fruit or vegetable is also prevented.

The bag, as above described, as been found practical to pack with oranges, apples, potatoes and the like by attaching the elastic closure to fingers of a machine, which fingers release the bag when the desired weight of contents has been packed, thus dropping the bag to a moving conveyor without the necessity of handling by an operator. This is made possible by the fact that the elastic closure automatically closes upon being released by the fingers, thus one full operation in a packing house is avoided.

A further advantage of the bag above described, lies in the fact that if any of the fruit or vegetables packed in the bag becomes spoiled, a storekeeper or the like can simply insert his hands through the elastic opening and remove the spoiled fruit or vegetables without destroying or cutting the bag, as is now necessary with the types of bags in present use.

While there has been described a particular shape of bag or receptacle of this invention, it will be understood that the invention is not restricted thereto, the essence of the invention being the provision of the elastic closure which tends to restrict the opening 18 but at no time entirely closing the opening 18; together with the manufacture of the bag from a thin transparent film such as Pliofilm, cellophane or the like.

What is claimed is:

1. A bag for the packaging of fresh fruits, vegetables and the like comprising: a sheet of thin transparent film joined together at the side and bottom and having an opening at the top; a ribbon elastic secured to the top of said sheet and having its edges folded on both sides of said sheet; said ribbon elastic normally tending to bias the edges of said opening towards a partially closed position.

2. A bag for the packaging of fresh fruits, vegetables and the like comprising: a sheet of thin transparent film joined together at the side and bottom and having an opening at the top; the edge of said opening being provided with a ribbon elastic; said ribbon elastic being folded over the edge of said opening on both sides thereof and secured thereto by stitches passing through both folds of said ribbon elastic and said edge.

3. A bag for the packaging of fresh fruits, vegetables and the like comprising: a sheet of thin transparent film joined together at the side and bottom and having an opening at the top; the edge of said opening being provided with a ribbon elastic; said ribbon elastic being folded over the edge of said opening on both sides thereof and secured thereto by floating stitches passing through both folds of said ribbon elastic and said edge.

4. A bag for the packaging of fresh fruits, vegetables and the like comprising: a sheet of Pliofilm joined together at the side and bottom and having an opening at the top; the edge of said opening being provided with a ribbon elastic; said ribbon elastic being folded over the edge of said opening on both sides thereof and secured thereto by floating stitches passing through both folds of said ribbon elastic and said edge.

FRANK BELMONT.

REFERENCES CITED

The following references are of record in the file of this patent:

UNITED STATES PATENTS

| Number | Name | Date |
| --- | --- | --- |
| 179,236 | Walsh | June 27, 1876 |
| 1,915,196 | McGuire | June 20, 1933 |
| 2,000,345 | Miller | May 7, 1935 |
| 2,037,175 | Northcross | Apr. 14, 1936 |

FOREIGN PATENTS

| Number | Country | Date |
| --- | --- | --- |
| 339,938 | Great Britain | Dec. 15, 1930 |
| 385,466 | Germany | Nov. 23, 1923 |